United States Patent
Henry et al.

(10) Patent No.: US 7,395,412 B2
(45) Date of Patent: *Jul. 1, 2008

(54) APPARATUS AND METHOD FOR EXTENDING DATA MODES IN A MICROPROCESSOR

(75) Inventors: G. Glenn Henry, Austin, TX (US);
Rodney E. Hooker, Austin, TX (US);
Terry Parks, Austin, TX (US)

(73) Assignee: iP-First, LLC, Fremont, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/227,008

(22) Filed: Aug. 22, 2002

(65) Prior Publication Data

US 2003/0172252 A1   Sep. 11, 2003

Related U.S. Application Data

(60) Provisional application No. 60/363,115, filed on Mar. 8, 2002.

(51) Int. Cl.
*G06F 9/34* (2006.01)
*G06F 9/318* (2006.01)
(52) U.S. Cl. ...................... 712/203; 712/213
(58) Field of Classification Search ............. 712/203, 712/209, 210, 213, 227, 229, 300; 703/26; 711/212, 214
See application file for complete search history.

(56) References Cited

U.S. PATENT DOCUMENTS 3,657,705 A   4/1972  Mekota, Jr. et al.
4,064,554 A   12/1977 Tubbs
4,217,638 A * 8/1980  Namimoto et al. .......... 711/220

(Continued)

FOREIGN PATENT DOCUMENTS

CN        1431584        7/2003

(Continued)

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

(Continued)

*Primary Examiner*—Daniel Pan
(74) *Attorney, Agent, or Firm*—Richard K. Huffman; James W. Huffman (57) ABSTRACT

An apparatus and method are provided for extending a microprocessor instruction set beyond its current capabilities to allow for extended size operands specifiable by programmable instructions in the microprocessor instruction set. The apparatus includes translation logic and extended execution logic. The translation logic translates an extended instruction into corresponding micro instructions for execution by the microprocessor. The extended instruction has an extended prefix and an extended prefix tag. The extended prefix specifies an extended operand size for an operand corresponding to a prescribed operation, where the extended operand size cannot be specified by an existing instruction set. The extended prefix tag indicates the extended prefix, where the extended prefix tag is an otherwise architecturally specified opcode within the existing instruction set. The extended execution logic is coupled to the translation logic. The extended execution logic receives the corresponding micro instructions and performs the prescribed operation using the operand.

27 Claims, 6 Drawing Sheets

Extended Instruction Format

U.S. PATENT DOCUMENTS

| | | | |
|---|---|---|---|
| 4,547,849 A | | 10/1985 | Louie et al. |
| 5,029,069 A | * | 7/1991 | Sakamura ................ 712/234 |
| 5,142,679 A | * | 8/1992 | Owaki et al. ............. 717/151 |
| 5,218,712 A | | 6/1993 | Cutler et al. |
| 5,448,744 A | | 9/1995 | Eifert et al. |
| 5,471,595 A | | 11/1995 | Yagi et al. |
| 5,481,684 A | * | 1/1996 | Richter et al. ............ 712/212 |
| 5,687,338 A | * | 11/1997 | Boggs et al. ............. 712/205 |
| 5,751,996 A | | 5/1998 | Glew et al. |
| 5,768,574 A | | 6/1998 | Dutton et al. |
| 5,778,220 A | | 7/1998 | Abramson et al. |
| 5,796,973 A | * | 8/1998 | Witt et al. ................ 712/208 |
| 5,822,778 A | | 10/1998 | Dutton et al. |
| 5,826,089 A | | 10/1998 | Ireton |
| 5,857,103 A | | 1/1999 | Grove |
| 5,875,342 A | | 2/1999 | Temple |
| 5,913,049 A | * | 6/1999 | Shiell et al. .............. 712/215 |
| 5,937,199 A | | 8/1999 | Temple |
| 5,991,872 A | | 11/1999 | Shiraishi et al. |
| 6,014,735 A | | 1/2000 | Chennupaty et al. |
| 6,029,222 A | | 2/2000 | Kamiya |
| 6,058,472 A | | 5/2000 | Panwar et al. |
| 6,085,312 A | | 7/2000 | Abdallah et al. |
| 6,157,996 A | | 12/2000 | Christie et al. |
| 6,199,155 B1 | | 3/2001 | Kishida et al. |
| 6,230,259 B1 | | 5/2001 | Christie et al. |
| 6,317,822 B1 | | 11/2001 | Padwekar |
| 6,351,806 B1 | | 2/2002 | Wyland |
| 6,405,305 B1 | | 6/2002 | Meier et al. |
| 6,434,693 B1 | | 8/2002 | Senter et al. |
| 6,456,891 B1 | | 9/2002 | Kranich et al. |
| 6,549,999 B2 | | 4/2003 | Kishida et al. |
| 6,560,694 B1 | | 5/2003 | McGrath et al. |
| 6,581,154 B1 | | 6/2003 | Zaidi |
| 6,647,488 B1 | | 11/2003 | Takeno et al. |
| 6,779,103 B1 | | 8/2004 | Alexander, III et al. |
| 6,823,414 B2 | | 11/2004 | Radhakrishna |
| 6,883,053 B2 | | 4/2005 | Shinagawa et al. |
| 2001/0013870 A1 | | 8/2001 | Pentkovski et al. |
| 2002/0194457 A1 | | 12/2002 | Akkary |
| 2003/0159020 A1 | * | 8/2003 | Henry et al. ............. 712/209 |
| 2003/0172252 A1 | | 9/2003 | Henry et al. |
| 2003/0196077 A1 | * | 10/2003 | Henry et al. ............. 712/245 |
| 2003/1881130 | | 10/2003 | Henry et al. |
| 2005/0102492 A1 | | 5/2005 | Henry et al. |
| 2005/0188179 A1 | | 8/2005 | Henry et al. |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Intel Architecture Software Developer's Manual, vol. 2: Instruction Set Reference, 1999. pp. 2-1 to 2-4, 3-332, 3-353 and B25.

Silberman et al. *An Architectural Framework for Supporting Heterogeneous Instruction-Set Architectures*. Computer, IEEE Computer Society, Long Beach, CA. US vol. 26, No. 6 Jun. 1, 1993. pp. 39-56. ISSN: 0018-0162.

Patterson & Hennessy. "Computer Organization and Design: The Hardware/Software Interface." 1998. Morgan Kaufmann Publishers, Inc. Second Edition. pp. 177-178, 297.

Dobb. "Microprocessor Resources." 2000. web.archive.org/web/20000118231610x86.org/secrets/opcodes/Icebp.htm.

\* cited by examiner

Fig. 1 (Related Art)

Microprocessor Instruction Format

Fig. 2 (Related Art)

8-Bit Opcode Map

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Extended Prefix for Prescribing Extended Data Mode*

Fig. 7

*Translate Stage Details*

*Method for Overriding Data Mode In A Microprocessor*

APPARATUS AND METHOD FOR EXTENDING DATA MODES IN A MICROPROCESSOR

CROSS-REFERENCE TO RELATED APPLICATIONS

This application claims the benefit of U.S. Provisional Application No. 60/363,115 filed on Mar. 8, 2002.

This application is related to the following co-pending U.S. Patent Applications, all of which have a common assignee and common inventors.

| Ser. No. | FILING DATE | TITLE |
|---|---|---|
| 10/144,595 | May 9, 2002 | APPARATUS AND METHOD FOR EXTENDING A MICROPROCESSOR INSTRUCTION SET |
| 10/144,592 | May 9, 2002 | APPARATUS AND METHOD FOR CONDITIONAL INSTRUCTION EXECUTION |
| 10/227,592 | Aug. 22, 2002 | APPARATUS AND METHOD FOR SELECTIVE MEMORY ATTRIBUTE CONTROL |
| 10/144,593 | May 9, 2002 | APPARATUS AND METHOD FOR SELECTIVE CONTROL OF CONDITION CODE WRITE BACK |
| 10/144,590 | May 9, 2002 | MECHANISM FOR EXTENDING THE NUMBER OF REGISTERS IN A MICROPROCESSOR |
| 10/227,571 | Aug. 22, 2002 | APPARATUS AND METHOD FOR EXTENDING ADDRESS MODES IN A MICROPROCESSOR |
| 10/283,397 | Oct. 29, 2002 | SUPPRESSION OF STORE CHECKING |
| 10/384,390 | Mar. 10, 2003 | SELECTIVE INTERRUPT SUPPRESSION |
| 10/227,583 | Aug. 22, 2002 | NON-TEMPORAL MEMORY REFERENCE CONTROL MECHANISM |
| 10/144,589 | May 9, 2002 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating extended data modes into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multimedia operations). This technology pull has resulted in an incredible number of advances in the art which have been incorporated in microprocessor designs such as extensive pipelining, super-scalar architectures, cache structures, out-of-order processing, burst access mechanisms, branch predication, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—furthermore accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet while in the past developers have been able to incorporate newly developed architectural features into existing instruction set architectures, the means whereby use of these features is enabled—programmable instructions—are becoming scarce. More specifically, there are no more "spare" instructions in certain instruction sets of interest that provide designers with a way to incorporate newer features into an existing architecture.

In the x86 instruction set architecture, for example, there are no remaining undefined 1-byte opcode states. All 256 opcode states in the primary 1-byte x86 opcode map are taken up with existing instructions. As a result, x86 microprocessor designers must presently make a choice to either provide new features or to retain legacy compatibility. If new programmable features are to be provided, then they must be assigned to opcode states in order for programmers to exercise those features. And if spare opcode states do not remain in an existing instruction set architecture, then some of the existing opcode states must be redefined to provide for specification of the new features. Thus, legacy compatibility is sacrificed in order to make way for new feature growth.

One area of growth that continues to plague microprocessor designers is operand size. Early microprocessor designs provided 8-bit operations using 8-bit operands. Then, as computations within application programs became more complex, the size of the operands and commensurate computations grew to 16 bits. The present state of the art in microprocessors for desktop/laptop computing applications provides for 32-bit operands/operations. The size of operands/operations in a microprocessor is commonly referred to as a data mode. Hence, to retain compatibility with legacy application programs, a present day desktop/laptop microprocessor is capable of operating in a 32-bit data mode, a 16-bit data mode, and even perhaps an 8-bit data mode.

But even at present, there are application programming areas that are disadvantageously impacted because present day microprocessors do not support extended data modes such as 64-bit data mode and 128-bit data mode. Yet, to support these extended data modes within an architecture that has no spare opcode values would require redefinition of existing opcodes, thereby abandoning support for legacy applications.

Therefore, what is needed is an apparatus and method that incorporate extended data modes into an existing microprocessor instruction set architecture having a completely full opcode set, where incorporation of the extended data modes additionally allows a conforming microprocessor to retain the capability to execute legacy application programs.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for extended size operands that can be operated upon by programmable instructions in the microprocessor instruction set. In one embodiment an apparatus is provided, for extending data modes within a microprocessor. The apparatus includes a translation unit and an extended execution unit. The translation unit translates an extended instruction into corresponding micro instructions for execution by the microprocessor. The extended instruction has an extended prefix and an extended prefix tag. The extended prefix specifies an extended operand size for an operand corresponding to a prescribed operation that is prescribed by said extended instruction, where the extended operand size cannot be specified by an existing instruction set. The extended prefix tag indicates the extended prefix, where the extended prefix tag is an otherwise architecturally specified opcode within the existing instruction set. The extended execution unit is coupled to the translation unit. The extended execution unit receives the corresponding micro instructions and performs the prescribed operation using the operand according to the extended operand size. The translation unit includes an escape instruction detection unit, for detecting the extended prefix tag; an instruction decoding unit, for determining the operand along with the operation to be performed; and an extended decoding unit, coupled to the escape instruction detection unit and the instruction decoding unit, for determining the extended operand size, and for prescribing the extended operand size within the corresponding micro instructions.

One aspect of the present invention contemplates a microprocessor apparatus for extending an existing microprocessor instruction set to provide for extended data modes. The microprocessor apparatus includes an extended instruction and a translator. The extended instruction is stored within computer memory and prescribes an extended operand size for an operand. The operand corresponds to a prescribed operation, where the extended instruction includes a selected opcode in the existing microprocessor instruction set followed by an n-bit extended prefix. The selected opcode indicates the extended instruction and the n-bit extended prefix indicates the extended operand size. The extended operand size cannot otherwise be prescribed according to the existing microprocessor instruction set. The translator is configured to receive the extended instruction. The translator generates a micro instruction sequence directing a microprocessor to execute the prescribed operation on the operand according to the extended operand size. The translator includes an escape instruction detector, for detecting the selected opcode within the extended instruction; an instruction decoder, for decoding remaining parts of the extended instruction to determine the prescribed operation; and an extended prefix decoder, coupled to the escape instruction detector and the instruction decoder, for decoding the n-bit extended prefix, and for specifying the extended operand size within the micro instruction sequence.

Another aspect of the present invention comprehends an instruction set extension apparatus for providing extended data mode capabilities to an existing instruction set. The instruction set extension apparatus has an escape tag, an extended operand size specifier, and an extended execution unit. The escape tag is stored within a computer memory and is received by a translator, and indicates that accompanying parts of a corresponding instruction prescribe an extended operation to be performed by a microprocessor, where the escape tag is a first opcode within the existing instruction set. The extended operand size specifier is coupled to the escape tag and is one of said accompanying parts. The extended operand size specifier prescribes one of a plurality of data modes that corresponds to the extended operation. The extended execution unit is coupled to the translator. The extended execution unit executes the extended operation using the one of the plurality of data modes, where the existing instruction set provides only for existing data modes other than the one of the plurality of data modes. The translator includes an escape tag detection unit, for detecting the escape tag, and for directing that the accompanying parts be translated according to extended translation conventions; and a decoding unit, coupled to the escape tag detection unit, for performing translation of instructions according to conventions of the existing instruction set, and for performing translation of the corresponding instruction according to the extended translation conventions to enable execution of the extended operation according to the one of the plurality of data modes.

A further aspect of the present invention provides a method for extending an existing instruction set architecture to provide for programmable specification of an extended data mode within a microprocessor. The method includes providing an extended instruction, the extended instruction including an extended tag along with an extended prefix, where the extended tag is a first opcode entity according to the existing instruction set architecture; prescribing, via the extended prefix and remaining parts of the extended instruction, the extended data mode and a specified operation, where the existing instruction set architecture only provides instructions for specifying data modes other than the extended data mode, wherein the prescribing includes first specifying the specified operation, wherein the first specifying includes employing a second opcode entity according to the existing instruction set architecture; translating the extended instruction into micro instructions that direct an extended execution unit to perform the extended operation according to said extended data mode; and executing the specified operation according to the extended data mode. The providing includes choosing the x86 ICE BKPT opcode (i.e., opcode F1) as the extended tag. The translating includes detecting the extended tag within the extended instruction; first decoding remaining parts of the extended instruction to determine the specified operation; and second decoding the extended prefix, and specifying the extended data mode within the micro instructions.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
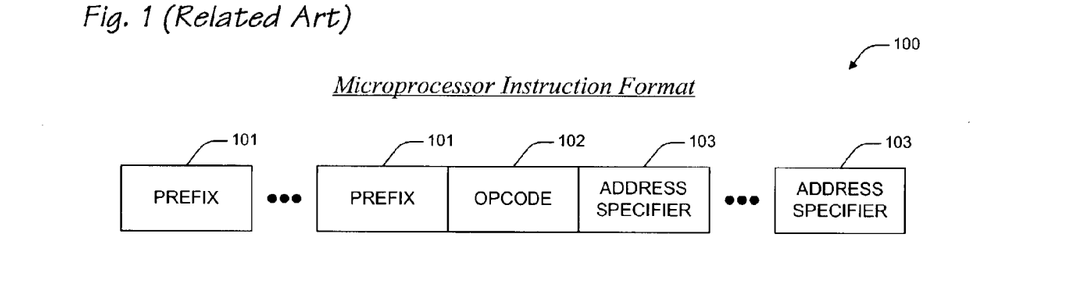
FIG. 1 is a block diagram illustrating a related art microprocessor instruction format.
Figure 2:
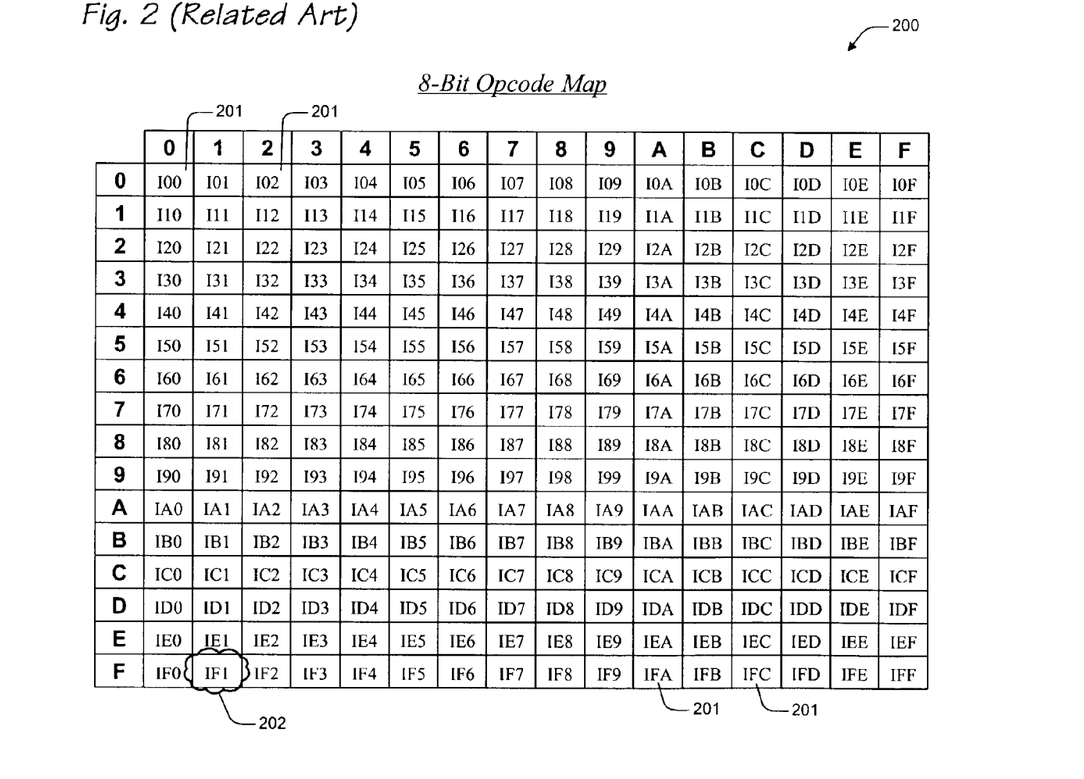
FIG. 2 is a table depicting how instructions in a instruction set architecture are mapped to logic states of bits in an 8-bit opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1-2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1-2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3-9. By employing an existing, yet archaic, opcode as a prefix tag for an extended instruction that follows, the present invention enables microprocessor designers to overcome the limitations of completely full instruction set architectures, thereby allowing them to provide programmers with the capability to perform operations using operands having a size greater than that which has heretofore been provided while concurrently retaining all the features that are required to run legacy application programs.

Turning to FIG. 1, a block diagram is presented illustrating a related art microprocessor instruction format 100. The related art instruction 100 has a variable number of instruction entities 101-103, each set to a specified value, that together make up a specific instruction 100 for a microprocessor. The specific instruction 100 directs the microprocessor to perform a specific operation such as adding two operands together, or moving an operand from/to memory to/from an internal register. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different operand sizes (e.g., 8-bit, 16-bit, 32-bit). Accordingly, these processors are programmed to a default operand size (say, 32-bit), and prefixes 101 are provided in their respective instruction sets enabling programmers to selectively override the default operand size (say, to perform 16-bit operations) on an instruction-by-instruction basis. Selectable operand size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to values of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCK-LPS) operation instead of the Add With Carry (ADC). Features such as described in this x86 example are enabled in part in a present day microprocessor because instruction translation/decoding logic in the microprocessor interprets the entities 101-103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have run into a brick wall in terms of providing enhancements for a very straightforward reason: all of the available/spare opcode states have been used up, that is, all of the opcode values in the opcode map 200 have been architecturally specified. When all of the available opcode values have been assigned as either opcode entities 102 or prefix entities 101, then there are no more values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One alternative that falls short of entirely obliterating an existing instruction set and replacing it with a new format 100 and opcode map 200 is to substitute new instruction meanings for only a subset of existing opcodes 201, say opcodes 40H through 4FH in FIG. 2. Under this hybrid technique, a conforming microprocessor operates exclusively in one of two operating modes: a legacy-compatible mode, where opcodes 40H-4FH are interpreted according to legacy rules, or an enhanced mode, where opcodes 40H-4FH are interpreted according to enhanced architectural rules. This technique indeed enables designers to incorporate new features into a design, but when the conforming microprocessor is running in an enhanced mode it excludes execution of any application program that uses opcodes 40H-4FH. Hence, from the standpoint of retaining legacy compatibility, the legacy-compatible/enhanced mode technique is not optimum.

The present inventors, however, have noted the frequency of use of certain opcodes 201 in instruction sets 200 having fully-populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit extended operand size specifier prefix whereby programmers are enabled to prescribe an extended data mode for a corresponding operation on an instruction-by-instruction basis in a microprocessor. The extended data mode is provided over an above those existing data modes supporting by the microprocessor's existing instruction set architecture. The present invention will now be discussed with reference to FIGS. 3-9.

Figure 3:
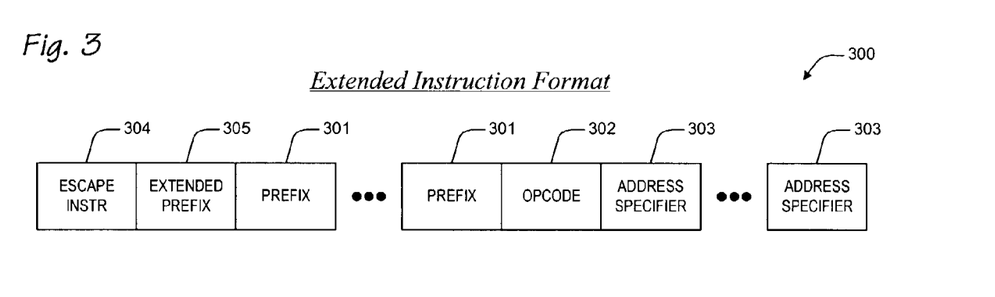
FIG. 3 is a block diagram featuring an extended instruction format according to the present invention.

Turning to FIG. 3, a block diagram is presented featuring an extended instruction format 300 according to the present invention. Very much like the format 100 discussed with reference to FIG. 1, the extended instruction format 300 has a variable number of instruction entities 301-305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, where the operands are located, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301-303 in a formatted extended instruction 300. The purpose of the two additional entities 304, 305 is to provide the capabilities for programmers to specify an extended data mode within a conforming microprocessor for the purpose of executing an operation according to the extended data mode, where the extended data mode is not otherwise programmable by an existing instruction set for the conforming microprocessor. The two additional entities 304, 305 provide for the incorporation of larger sized operands/operations in a microprocessor design having a fully populated instruction set architecture. The optional entities 304, 305 are an extended instruction tag 304 and an extended operand size specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended prefix 305 prescribes an operand/operations size, or data mode, that corresponds to a specified operation. In one embodiment, the escape tag 304 indicates that accompanying parts 301-303, 305 of a corresponding instruction 300 prescribe an extended operation to be performed by the microprocessor. The extended operand size specifier 305, or extended prefix 305, prescribes one of a plurality of operand sizes that correspond to execution of an associated operation. Extended execution logic in the microprocessor accesses the operands in extended-size registers during execution of the extended operation and processes the operands using processing rules consistent with the specified operand size, or data mode.

To summarize the extended data mode technique according to the present invention, an extended instruction is configured to prescribe an extended data mode in an existing microprocessor instruction set, where the extended data mode cannot otherwise be prescribed according to the existing microprocessor instruction set. The extended instruction includes one of the opcodes/instructions 304 in the existing instruction set and an n-bit extended features prefix 305. The selected opcode/instruction serves as an indicator 304 that the instruction 300 is an extended features instruction 300 (that is, it prescribes extensions to the microprocessor architecture), and the n-bit features prefix 305 indicates the extended data mode. In an alternative embodiment, the extended prefix 305 is 8-bits in size, providing for the specification of up to 256 different data modes. An n-bit prefix embodiment provides for the specification of up to $2^n$ different data modes. In one embodiment, a 64-bit data mode is provided for that overrides a default data mode (say, 32-bit or 16-bit) that is in place for a conforming microprocessor. Accordingly, during execution of the corresponding operation, 64-bit operands are operated upon by execution logic using 64-bit operations (e.g., add, subtract, logical, etc.). A further embodiment allows a programmer to specify either 64-bit or 128-bit data mode.

Figure 4:
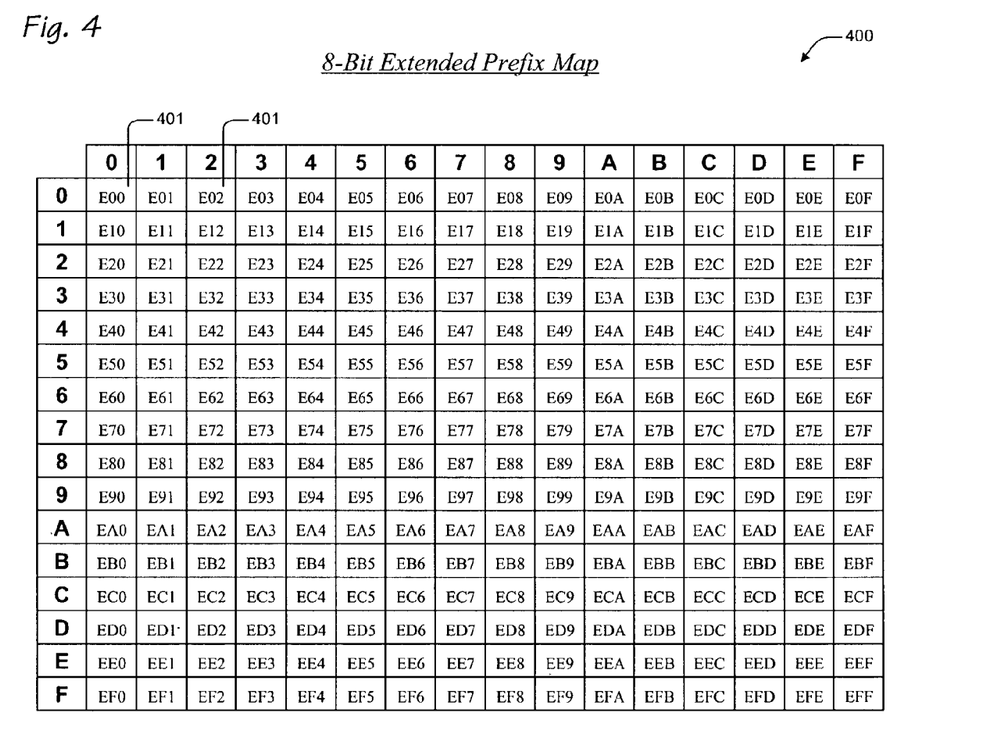
FIG. 4 is a table showing how extended architectural features are mapped to logic states of bits in an 8-bit extended prefix embodiment according to the present invention.

Now turning to FIG. 4, a table 400 is presented showing how register extensions are mapped to logic states of bits in an 8-bit extended prefix embodiment according to the present invention. Similar to the opcode map 200 discussed with reference to FIG. 2, the table 400 of FIG. 4 presents an exemplary 8-bit extended data mode prefix map 400 that associates up to 256 values of an 8-bit extended prefix entity 305 with corresponding extended data modes 401 (e.g., E34, E4D, etc.) of a conforming microprocessor. In the case of an x86 embodiment, the 8-bit extended feature prefix 305 according to the present invention serves to provide for data modes 401 (i.e., E00-EFF) which are not provided for by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

Figure 5:
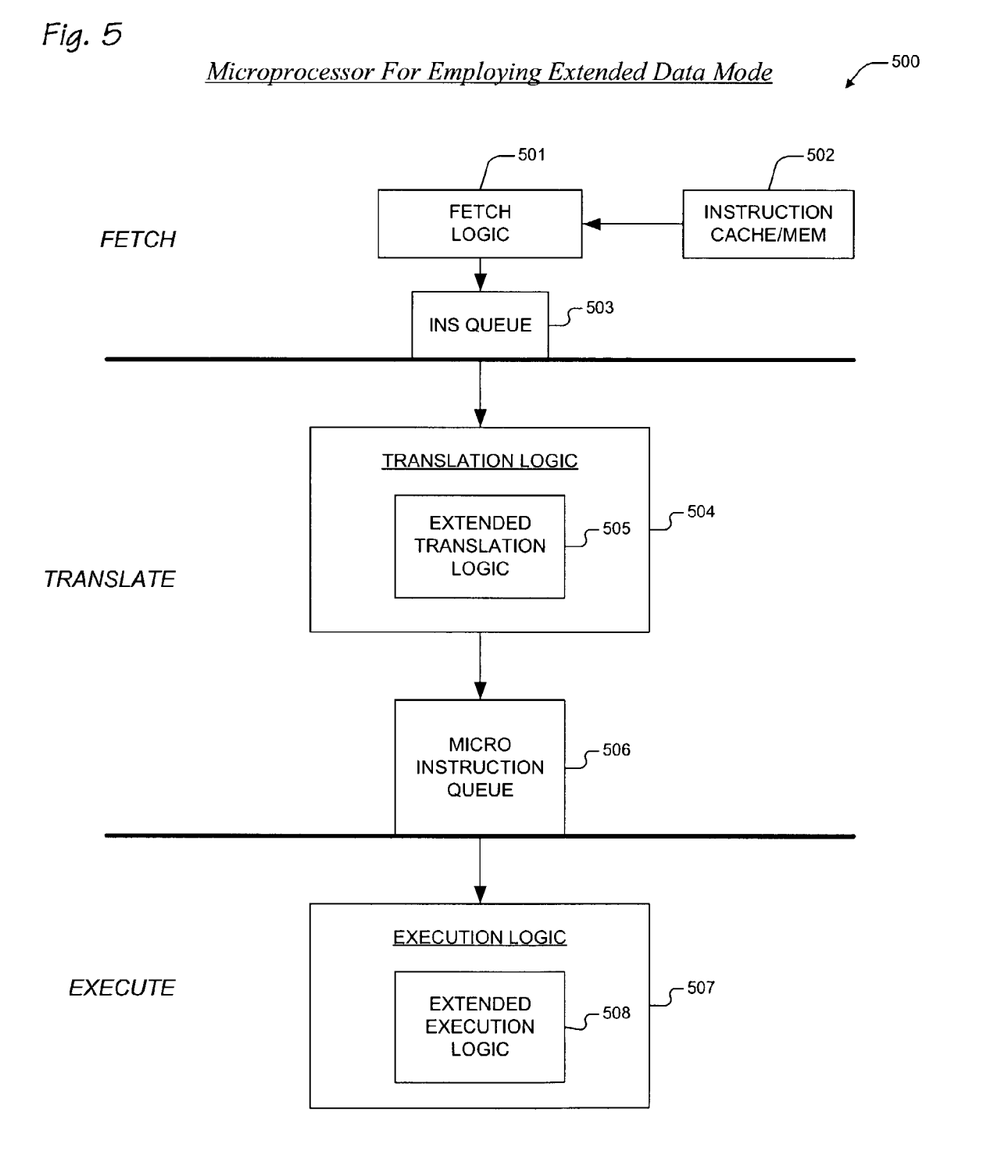
FIG. 5 is a block diagram illustrating a pipeline microprocessor for employed extended data modes according to the present invention.

Now referring to FIG. 5, a block diagram is presented illustrating a pipeline microprocessor 500 for performing extended data mode operations according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that direct the microprocessor 500 to perform the operations prescribed by the instructions. The extended translation logic 505 detects those instructions having an extended prefix tag according to the present invention and also provides for translation/decoding of corresponding extended data mode specifier prefixes. In an x86 embodiment, the extended translation logic 505 is configured to detect an extended prefix tag of value F1H, which is the x86 ICE BKPT opcode. Extended micro instruction fields are provided in the micro instruction queue 506 to allow for the specification of extended data modes within the microprocessor 500.

The micro instructions are provided from the micro instruction queue 506 to the execution logic 507, wherein the extended execution logic 508 is configured to access internal microprocessor registers therein according to specification by the extended micro instruction fields. A plurality of source operands are retrieved from source operand extended registers as prescribed for employment during execution of a specified operation. The extended execution logic 508 performs the operation prescribed by the micro instructions and generates corresponding results. Following generation of the corresponding results, the extended execution logic 508 writes back the corresponding results into destination operand extended registers as prescribed by the extended micro instruction fields.

One skilled in the art will appreciate that the microprocessor 500 described with reference to FIG. 5 is a simplified representation of a present day pipeline microprocessor 500. In fact, a present day pipeline microprocessor 500 comprises upwards to 20-30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Figure 6:
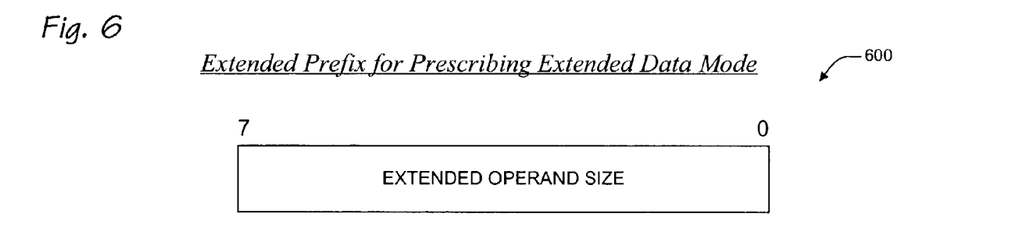
FIG. 6 is a block diagram featuring one embodiment of an extended prefix for prescribing an extended data mode in a microprocessor according to the present invention.

Turning now to FIG. 6, a block diagram is presented featuring one embodiment of an extended prefix 600 for prescribing extended operands/operations in a microprocessor according to the present invention. The extended operand/operations specifier prefix 600 is 8-bits in size. In one embodiment, the value of the 8-bit prefix 600 specifies an extended data mode for a corresponding operation, where the corresponding operation is prescribed by remaining parts of an extended instruction according to the present invention, as herein described. In an x86 embodiment, the extended data mode (e.g., 64-bit operands/operations) is prescribed to override a default data mode (e.g., 32-bit operands/operations).

The exemplary embodiment of an extended prefix 600 according to the present invention as shown in FIG. 6 reflects an application wherein the entire prefix 600 is employed to specify an extended data mode. One skilled in the art will appreciate, however, that the number of bits required to specify one from among a plurality of extended data modes depends upon the number of extended data modes within the plurality. Accordingly, an embodiment capable of prescribing either a 64-bit data mode or a 128-bit data mode would require only one bit of the prefix 600 to distinguish between the two modes. Consequently, the remaining bits of the prefix 600 can be employed to specify other extended features that an existing instruction set architecture is incapable of addressing.

Figure 7:
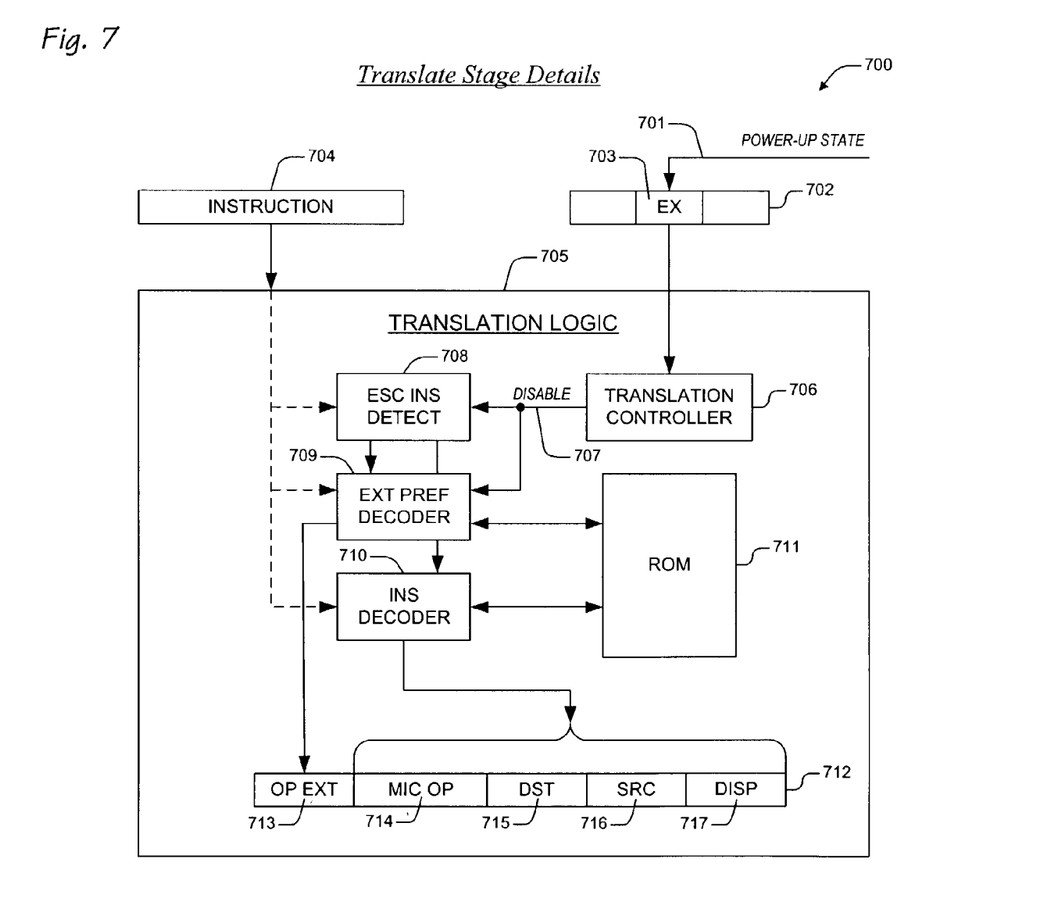
FIG. 7 is a block diagram featuring details of translate stage logic within the microprocessor of FIG. 5.

Turning now to FIG. 7, a block diagram is presented featuring details of translate stage logic 700 within the microprocessor of FIG. 5. The translate stage logic has an instruction buffer 704 that provides an extended instruction to translation logic 705. The translation logic 705 is coupled to a machine specific register 702 that has an extended features field 703. The translation logic 705 has a translation controller 706 that provides a disable signal 707 to an escape instruction detector 708 and an extended decoder 709. The escape instruction detector 708 is coupled to the extended decoder 709 and an instruction decoder 710. The extended decoding logic 709 and the instruction decoding logic 710 access a control read-only memory (ROM) 711, wherein are stored template micro instruction sequences that correspond to some of the extended instructions. The translation logic 705 also has a micro instruction buffer 712 having an opcode extension field 713, a micro opcode field 714, a destination field 715, a source field 716, and a displacement field 717.

Operationally, during power-up of the microprocessor, the state of the extended field 703 within the machine specific register 702 is established via signal power-up state 701 to indicate whether the particular microprocessor is capable of translating and executing extended instructions according to the present invention for providing extended data modes in the microprocessor. In one embodiment, the signal 701 is derived from a feature control register (not shown) that reads a fuse array (not shown) configured during fabrication of the part. The machine specific register 702 provides the state of the extended features field 703 to the translation controller 706. The translation control logic 706 controls whether or not instructions from the instruction buffer 704 are translated according to extended translation rules or according to conventional translation rules. Such a control feature is provided to allow supervisory applications (e.g., BIOS) to enable/disable extended execution features of the microprocessor. If extended features are disabled, then instructions having the opcode state selected as the extended features tag would be translated according to the conventional translation rules. In an x86 embodiment having opcode state F1H selected as the tag, an occurrence of F1H under conventional translation would result in an illegal instruction exception. With extended translation disabled, the instruction decoder 710 would translate/decode all provided instructions 704 and would configure all fields 713-717 of the micro instruction 712. Under extended translation rules, however, occurrence of the tag would be detected by the escape instruction detector 708. The escape instruction detector 708 would accordingly allow the instruction decoder 710 to translate/decode the remaining parts of the extended instruction and configure the micro opcode field 714 and the displacement field 717 of the micro instruction 712 and the extended decoder 709 would decode/translate the extended prefix to configure the micro opcode extension field 713 of the micro instruction 712. Certain instructions would cause access to the control ROM 711 to obtain corresponding micro instruction sequence templates. Configured micro instructions 712 are provided to a micro instruction queue (not shown) for subsequent execution by the processor.

Figure 8:
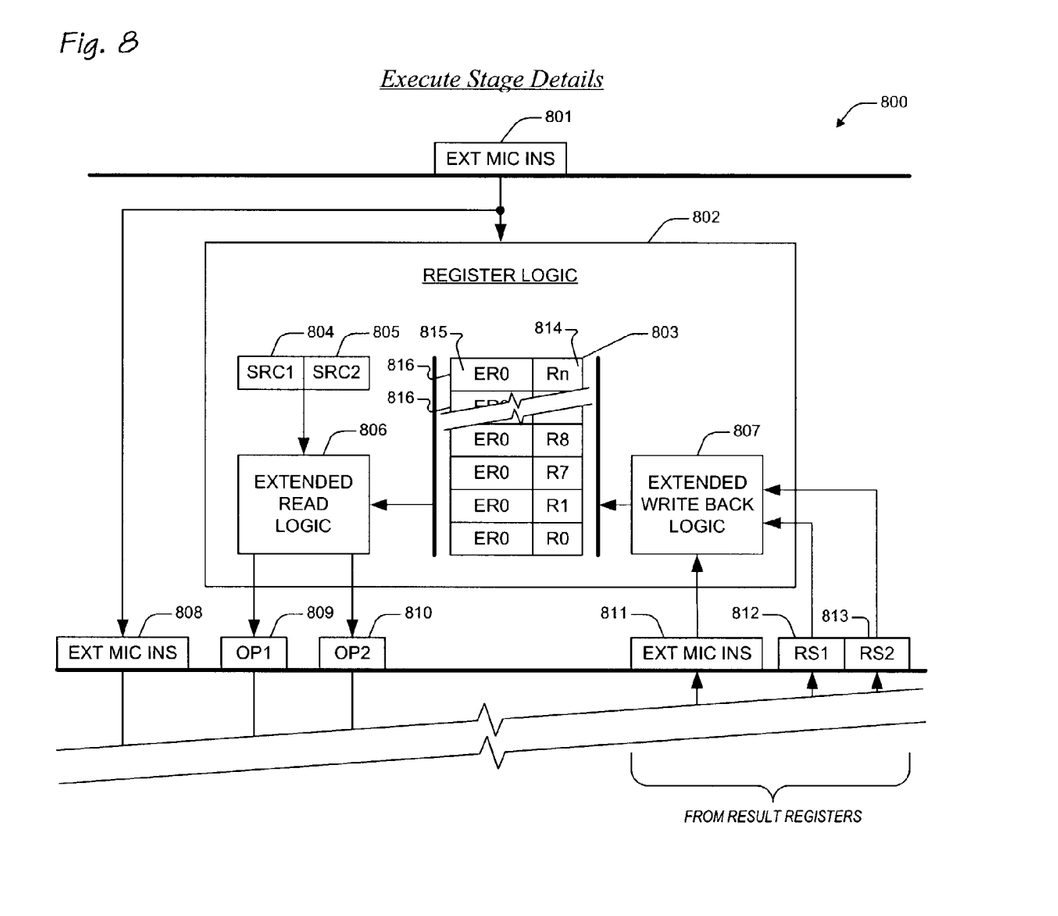
FIG. 8 is a block diagram illustrating extended execution stage logic within the microprocessor of FIG. 5.

Now referring to FIG. 8, a block diagram is presented illustrating extended register stage logic 800 within the microprocessor of FIG. 5. The extended register stage logic 800 has register logic 802 that retrieves an extended micro instruction according to the present invention from a micro instruction buffer 801 or micro instruction queue 801. The register logic 802 has an extended register file 803 comprising a plurality of extended registers 816. Each of the extended registers 816 has a default operand field 814 and an operand extension field 815. In an x86 embodiment, the default operand field 814 is 32 bits wide to support storage and retrieval of existing x86 32-bit operands. In a 64-bit embodiment, the operand extension field 815 is 32 bits wide to allow for operand growth up to 64 bits. A 128-bit embodiment provides a 96-bit operand extension field 815. The registers 816 are accessed for retrieval of source operands by extended read logic 806 and are accessed for storage of result operands by extended write back logic 807. The extended read logic 806 outputs the source operands OP1, OP2, to two operand buffers 809, 810. Result operands RS1, RS2 are provide to the extended write back logic 807 via two result buffers 812, 813.

In operation, extended micro instructions are provided from the micro instruction queue 801 to the register logic 802 in synchronization with a pipeline clock (not shown). During a clock cycle, the extended read logic 802 decodes source operand address fields 804, 805 of the extended micro instruction to determine which of the registers 816 contain source operands for employment by a prescribed operation. The value of the opcode extension field (not shown) of the extended micro instruction 801 determines the data mode to be employed by the read logic 806 when accessing the register file 803. For default data modes, only the default operand field 814 within addressed registers 816 is accessed. For extended data modes, both the default field 814 and a commensurate portion of the operand extension field 815 are accessed to retrieve the source operands. Accordingly, the source operands OP1, OP2 are retrieved from the register file 803 and are provided to source operand registers 809, 810.

Also, the extended micro instruction is piped to buffer 808 so that it will be available for employment by subsequent pipeline stages (not shown) in the microprocessor. During the same clock cycle, results RS1, RS2 of a recently executed operation are written back into destination registers 816 as prescribed by destination register fields (not shown) in completed micro instruction buffer 811. The opcode extension field value (not shown) within the completed micro instruction buffer 811 determines whether or not results are written back into the operand extension fields 815 of the destination registers 816 along with what portion of the extension fields 815 are written. The corresponding result operands RS1, RS2 are provided in buffers 812, 813.

The register stage logic 800 depicted in FIG. 8 provides the ability to coherently access two source registers and two result registers during a single clock cycle. An alternative embodiment provides for two source operands and a single destination operand. To ensure coherency of the registers 816, the extended register logic 802 accesses source operands OP1, OP2 prior to performing write back of results RS1, RS2.

Figure 9:
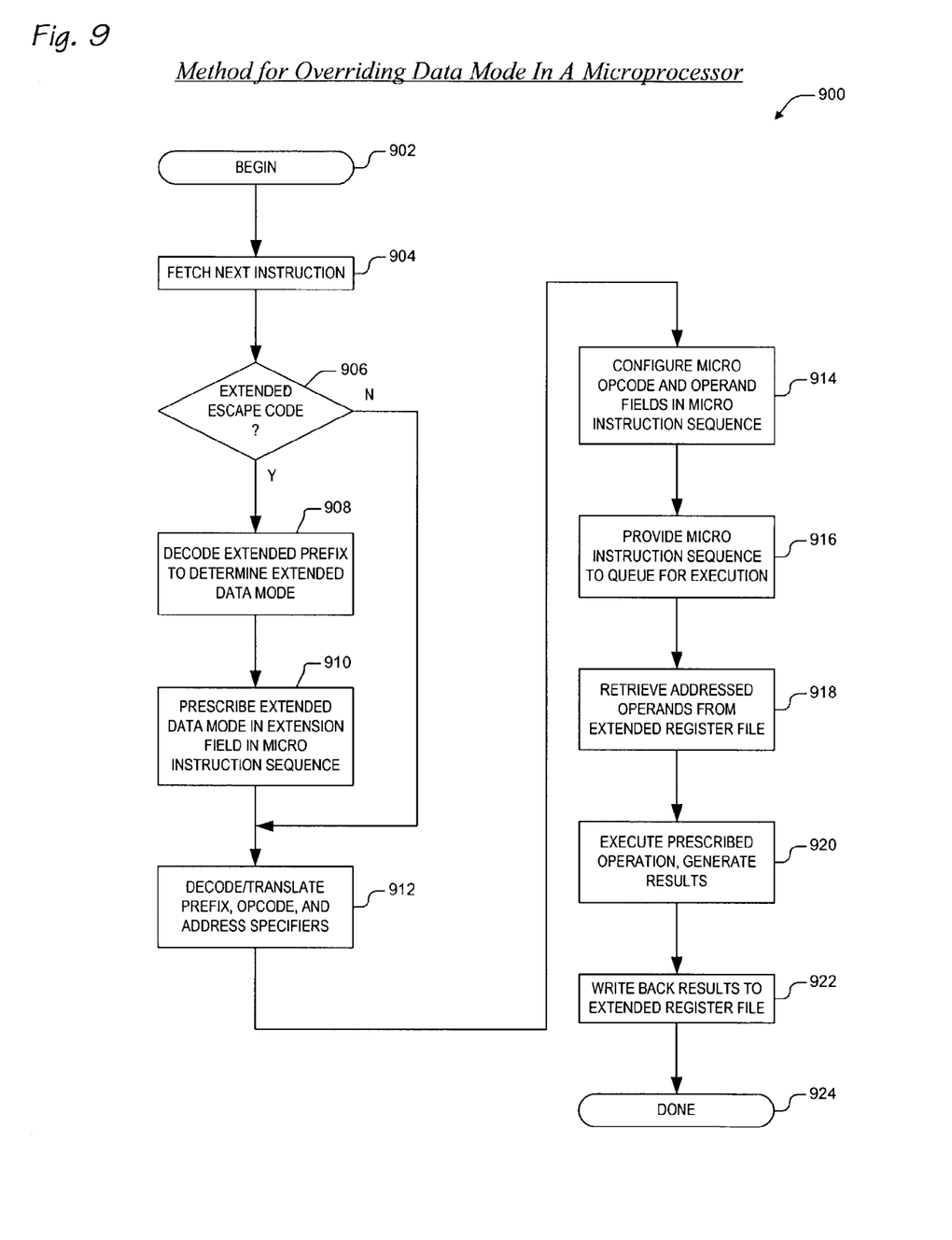
FIG. 9 is a flow chart depicting a method for translating and executing instructions that prescribe an extended data mode operation in a microprocessor according to the present invention.

Now referring to FIG. 9, a flow chart 900 is presented depicting a method for translating and executing instructions that enables a programmer to specify an extended data mode in a microprocessor according to the present invention. Flow begins at block 902 wherein a program configured with extended feature instructions is provided to a microprocessor. Flow then proceeds to block 904.

At block 904, a next instruction is fetched from cache/memory. Flow then proceeds to decision block 906.

At decision block 906, the instruction fetched in block 904 is evaluated to determine if an extended escape code is provided according to the present invention. In an x86 embodiment, the evaluation is made to detect opcode value F1 (ICE BKPT). If the extended escape code is detected, then flow proceeds to block 908. If the extended escape code is not present, then flow proceeds to block 912.

At block 908, an extended prefix part of the extended instruction is decoded/translated to determine an extended data mode that has been prescribed for execution of the present operation. Flow then proceeds to block 910.

At block 910, the extended data mode for the present operation is prescribed in an extension field of a corresponding micro instruction sequence. Flow then proceeds to block 912.

At block 912, all remaining parts of the instruction are decoded/translated to determine the prescribed operation, addresses of operands for the operation, and the application of existing architectural features prescribed by prefixes according to the existing instruction set architecture. Flow then proceeds to block 914.

At block 914, a micro instruction sequence is configured to specify the prescribed operation along with its corresponding opcode extensions. Flow then proceeds to block 916.

At block 916, the micro instruction sequence is provided to a micro instruction queue for execution by the microprocessor. Flow then proceeds to block 918.

At block 918, the micro instruction sequence is retrieved by extended register logic according to the present invention. The extended register logic retrieves operands corresponding to the prescribed operation from specified registers. Operands are sized according to the data mode (i.e., default or extended) prescribed within the micro instruction sequence. Flow then proceeds to block 920.

At block 920, extended execution logic employs the prescribed data mode to execute the prescribed operation using the operands accessed in block 918 to generate result operands. Flow then proceeds to block 922.

At block 922, the result operands are provided to the extended register logic and are written back into extended registers using the data mode as prescribed by the micro instruction sequence. Flow then proceeds to block 924.

At block 924, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to specify extended data modes in an extended instruction which are not otherwise provided for by existing instructions in a microprocessor instruction set.

In addition, the present invention has been predominately described in terms of 64-bit and 128-bit extended data modes. These modes are, however, provided only to teach aspects of the present invention in the context of present day data modes exhibited by desktop/laptop microprocessors. One skilled in the art will appreciate, however, that the scope of the present invention can be extended to applications requiring very large or very small operands/operations, odd-sized operands/operations, or applications having variable operands/operations where the size of a particular operand/operation is specified on an instruction-by-instruction basis.

Furthermore, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, for extending data modes within a microprocessor, the apparatus comprising:
    a translation unit translates an extended instruction stored in a computer readable storage into corresponding micro instructions executed by the microprocessor, wherein said extended instruction comprises:
        an extended prefix, for specifying an extended operand size for an operand corresponding to an operation that is prescribed by said extended instruction, wherein said extended operand size cannot be specified by an existing instruction set; and an extended prefix tag, for indicating said extended prefix, wherein said extended prefix tag is an otherwise architecturally specified opcode within said existing instruction set;

wherein said translation unit comprises:
an escape instruction detection unit, for detecting said extended prefix tag;
an instruction decoding unit, for determining said operand along with said operation to be performed; and
an extended decoding unit, coupled to said escape instruction detection unit and said instruction decoding unit, for determining said extended operand size, and for prescribing said extended operand size within said corresponding micro instructions, and
an extended execution unit, coupled to said translation unit, receiving said corresponding micro instructions, and executing said operation using said operand according to said specified extended operand size for an operand.

2. The apparatus as recited in claim 1, wherein said extended instruction further comprises instruction entities according to said existing instruction set.

3. The apparatus as recited in claim 2, wherein said instruction entities prescribe said operation to be executed by the microprocessor, and wherein said operand corresponding to said operation is retrieved/stored from/to a register, wherein said register supports retrieval/storage of operands according to a plurality of operand sizes.

4. The apparatus as recited in claim 3, wherein said plurality of operand sizes comprises a 64-bit operand size.

5. The apparatus as recited in claim 4, wherein said plurality of operand sizes further comprises a 128-bit operand size.

6. The apparatus as recited in claim 1, wherein said extended prefix directs the microprocessor to override a default operand size for said operand during execution of said prescribed operation.

7. The apparatus as recited in claim 1, wherein said extended prefix comprises 8 bits.

8. The apparatus as recited in claim 1, wherein said extended prefix comprises:
an extended operand size field, for specifying said extended operand size for said operand, wherein said extended operand size is one of a plurality of operand sizes.

9. The apparatus as recited in claim 1, wherein said existing instruction set comprises the x86 instruction set.

10. The apparatus as recited in claim 9, wherein said extended prefix tag comprises opcode F1 (ICE BKPT) in the x86 instruction set.

11. A microprocessor apparatus, for extending an existing microprocessor instruction set stored in a computer readable storage to provide for extended data modes, the microprocessor apparatus comprising:
an extended instruction, stored within a memory storage, configured to prescribe an extended operand size for an operand, said operand corresponding to a prescribed operation, wherein said extended instruction comprises a selected opcode in the existing microprocessor instruction set followed by an n-bit extended prefix, said selected opcode indicating said extended instruction and said n-bit extended prefix indicating said extended operand size, wherein said extended operand size cannot otherwise be prescribed according to the existing microprocessor instruction set; and
a translator receives said extended instruction, and generates a micro instruction sequence directing a microprocessor to execute said prescribed operation on said operand according to said prescribed extended operand size said prescribed operation being executed by said microprocessor, wherein said translator comprises:
an escape instruction detector, for detecting said selected opcode within said extended instruction;
an instruction decoder, for decoding remaining parts of said extended instruction to determine said prescribed operation; and
an extended prefix decoder, coupled to said escape instruction detector and said instruction decoder, for decoding said n-bit extended prefix, and for specifying said extended operand size within said micro instruction sequence.

12. The microprocessor apparatus as recited in claim 11, wherein said extended instruction further comprises:
remaining instruction entities, configured to specify said operand and said prescribed operation, wherein said operand is provided for said prescribed operation from/to an extended operand register.

13. The microprocessor apparatus as recited in claim 11, wherein said n-bit prefix comprises:
an data mode override field, configured to specify said extended operand size for said operand, wherein said extended operand size comprises one of a plurality of operand sizes.

14. The microprocessor apparatus as recited in claim 13, wherein said plurality of operand sizes comprises a 64-bit operand size.

15. The microprocessor apparatus as recited in claim 11, wherein said n-bit extended prefix comprises 8 bits.

16. The microprocessor apparatus as recited in claim 11, wherein the existing microprocessor instruction set is the x86 microprocessor instruction set.

17. The microprocessor apparatus as recited in claim 16, wherein said selected opcode comprises opcode ICE BKPT (i.e., opcode F1) in the x86 microprocessor instruction set.

18. An instruction set extension apparatus, for providing extended data mode capabilities to an existing instruction set stored in a computer readable storage, the instruction set extension apparatus comprising:
an escape tag, stored within a computer readable storage, for reception by a translator, and for indicating that accompanying parts of a corresponding instruction prescribe an extended operation to be executed by a microprocessor, wherein said escape tag is a first opcode within the existing instruction set;
an extended operand size specifier, coupled to said escape tag and being one of said accompanying parts, prescribing one of a plurality of data modes that corresponds to said extended operation; and
an extended execution unit, coupled to said translator, executing said extended operation using said one of said plurality of data modes, wherein the existing instruction set provides only for existing data modes other than said prescribed one of said plurality of data modes;
wherein remaining ones of said accompanying parts comprise a second opcode and an optional plurality of address specifiers, specifying said extended operation and a plurality of operands, and wherein said plurality of operands are executed upon according to said prescribed one of said plurality of data modes;
and wherein said translator comprises:
an escape tag detection unit, for detecting said escape tag, and for directing that said accompanying parts be translated according to extended translation conventions; and
a decoding unit, coupled to said escape tag detection unit, for performing translation of instructions according to conventions of the existing instruction set, and for performing translation of said corresponding instruction according to said extended translation conventions to enable execution of said extended operation according to said one of said plurality of data modes.

19. The instruction set extension apparatus as recited in claim 18, wherein said extended operand size specifier comprises 8 bits.

20. The instruction set extension apparatus as recited in claim 18, wherein the existing instruction set is the x86 instruction set.

21. The instruction set extension apparatus as recited in claim 18, wherein said first opcode comprises the ICE BKPT opcode (i.e., opcode F1) in the x86 instruction set.

22. The instruction set extension apparatus as recited in claim 18, wherein said translator translates said escape tag and said accompanying parts into corresponding micro instructions that direct an extended register unit to access an extended register during execution of said extended operation for retrieval/storage of an extended operand according to said one of said plurality of data modes.

23. The instruction set extension apparatus as recited in claim 18, wherein said one of said plurality of data modes comprises a 64-bit data mode.

24. The instruction set extension apparatus as recited in claim 18, wherein said one of said plurality of data modes comprises a 128-bit data mode.

25. A method for extending an existing instruction set architecture to provide for programmable specification of an extended data mode within a microprocessor, the method comprising:
   providing an extended instruction stored in a computer readable storage, the extended instruction including an extended tag along with an extended prefix, wherein the extended tag is a first opcode entity according to the existing instruction set architecture, wherein said providing comprises:
      choosing the x86 ICE BKPT opcode (i.e., opcode F1) as the extended tag;
   prescribing, via the extended prefix and remaining parts of the extended instruction, the extended data mode and a specified operation, wherein the existing instruction set architecture only provides instructions for specifying data modes other than the extended data mode, and wherein said prescribing comprises:
      first specifying the specified operation, wherein said first specifying comprises employing a second opcode entity according to the existing instruction set architecture;
   translating the extended instruction into micro instructions that direct an extended execution unit to execute the extended operation according to said extended data mode, where said translating comprises:
      detecting the extended tag within the extended instruction;
      first decoding remaining parts of the extended instruction to determine the specified operation; and
      second decoding the extended prefix, and specifying the extended data mode within the micro instructions; and
   executing the specified operation according to the extended data mode in said microprocessor.

26. The method as recited in claim 25, wherein said providing further comprises employing an 8-bit entity to configure the extended prefix.

27. The method as recited in claim 25, wherein said prescribing comprises:
   specifying a 64-bit data mode as the extended data mode.

* * * * *

UNITED STATES PATENT AND TRADEMARK OFFICE
CERTIFICATE OF CORRECTION

| | | |
|---|---|---|
| PATENT NO. | : 7,395,412 B2 | Page 1 of 1 |
| APPLICATION NO. | : 10/227008 | |
| DATED | : July 1, 2008 | |
| INVENTOR(S) | : Henry et al. | |

It is certified that error appears in the above-identified patent and that said Letters Patent is hereby corrected as shown below:

On the title page, item (73), the Assignee is spelled incorrectly. Rather than "iP-First, LLC," the assignee name should read: --IP-First, LLC.--

Signed and Sealed this

Twenty-sixth Day of August, 2008

JON W. DUDAS
*Director of the United States Patent and Trademark Office*